United States Patent [19]

Wolf et al.

[11] Patent Number: 4,848,802

[45] Date of Patent: Jul. 18, 1989

[54] TUBING CONNECTOR ASSEMBLY

[75] Inventors: Gary A. Wolf, Young America; Steven D. Petersen, Chaska; Jeffrey J. McKenzie, Watertown, all of Minn.

[73] Assignee: Fluoroware, Inc., Chaska, Minn.

[21] Appl. No.: 154,080

[22] Filed: Feb. 8, 1988

[51] Int. Cl.[4] ............................................. F16L 17/02
[52] U.S. Cl. ...................................... 285/39; 285/341; 285/423; 285/382.7
[58] Field of Search ...................... 285/382.7, 341, 423, 285/39

[56] References Cited

U.S. PATENT DOCUMENTS

| | | | |
|---|---|---|---|
| 2,693,376 | 11/1954 | Wurzburger | 285/382.7 X |
| 3,215,457 | 11/1965 | Teeters | 285/382.7 X |
| 3,501,177 | 3/1970 | Jacobs | 285/423 X |
| 3,830,532 | 8/1974 | Roberts | 285/341 |
| 3,989,283 | 11/1976 | Pepper | 285/423 X |

FOREIGN PATENT DOCUMENTS 215236  5/1961  Fed. Rep. of Germany ...... 285/341

Primary Examiner—Dave W. Arola
Attorney, Agent, or Firm—Faegre & Benson

[57] ABSTRACT

An improved tubing connector assembly for coupling flexible tubing and forming a fluid tight seal is described. The tubing connector assembly includes a connector threadably engaging a nut to fully enclose a ferrule and a collet. Due to the surface interactions between the components of the invention, the ferrule and collet are axially compressed to grasp the tubing and obtain a very strong mechanical grip.

21 Claims, 2 Drawing Sheets

TUBING CONNECTOR ASSEMBLY

FIELD OF THE INVENTION

This invention relates to an improved assembly for coupling tubing and forming a fluid tight seal. More particularly, this invention relates to a connector assembly for flexible plastic tubing using a connector body threadably engaged to a nut to axially compress a ferrule and a collet to grasp the surface of the tubing.

BACKGROUND OF THE INVENTION

A variety of assemblies for coupling pieces of tubing have been proposed. Typically these assemblies include a connector body for holding the tubing, a nut threadably engaging the connector body and one or more ferrules radially compressed by the nut-connector body engagement to grasp the tubing and form a fluid tight seal. However, these assemblies have not been fully satisfactory. Especially where flexible plastic tubing is employed, current designs do not provide a strong mechanical grip on the tubing such that the tubing resists twisting and separation from the connector assembly. Many of these prior assemblies also require substantial torque to compress the ferrule and achieve a fluid tight seal.

SUMMARY OF THE INVENTION

The present invention is an improved connector assembly consisting of a connector body, a nut, a ferrule and a collet. These parts each have a longitudinal bore for slideably receiving the tubing. The tubing is first slipped into the connector body until it bears against a seat created by a second bore coaxial to the longitudinal bore of the connector body. The ferrule, followed by the collet and nut, is then slipped onto the tubing. The nut threadably engages the connector body. As the nut further engages is drawn toward the connector body, the ferrule and the collet are advanced toward the connector body.

The connector body has a conical surface extending outward from the connector bore for receiving the advancing ferrule. The ferrule has a blunt nose with a conical surface radially extending from the ferrule nose toward the ferrule rear face. As the ferrule advances toward the connector body the conical surfaces of the ferrule and the connector body interact to deform the ferrule into the surface of the tubing. The deformation of the ferrule also creates a fluid tight seal between the tubing and the connector body.

The nut has an internal shoulder against which the end of the collet bears when the connector assembly is fully tightened, and a tapered camming surface radially extending from the shoulder. The collet has a similar camming surface radially extending from the end of the collet to the front face of the collet to form a wedge. The collet also has a sharp tooth or ridge around the circumference of the collet bore located generally below and behind the collet wedge. As the collet is drawn toward the connector body, the collet front face abuts the rear of the ferrule while the camming surfaces of the collet and the nut engage. The joint forces acting on the collet front face and the collet camming surface deform the wedge toward the collet bore, driving the tooth or ridge into the surface of the tubing. Thus, when fully tightened the connector assembly of the present invention grasps the tubing at two locations, the collet and the ferrule, resulting in a very strong mechanical grip.

A principal advantage of the present invention is a very strong mechanical grip and a fluid tight seal. Where flexible tubing is to be coupled, another advantage of the invention is the assembly's ability to resist tubing twisting and separation from the connector assembly. Other advantages include easy assembling of the connector components and the application of minimal torque to the assembly to secure the tubing and to form the fluid tight seal. Moreover, the nut's internal shoulder provides a positive stop for the collet to prevent undesirable over-travel resulting in unwanted leakage. Other advantages of the invention will become apparent to those skilled in the art from the following detailed description of the preferred embodiment when considered in conjunction with the accompanying drawings.

DETAILED DESCRIPTION OF THE PREFERRED EMBODIMENTS

Figure 1:
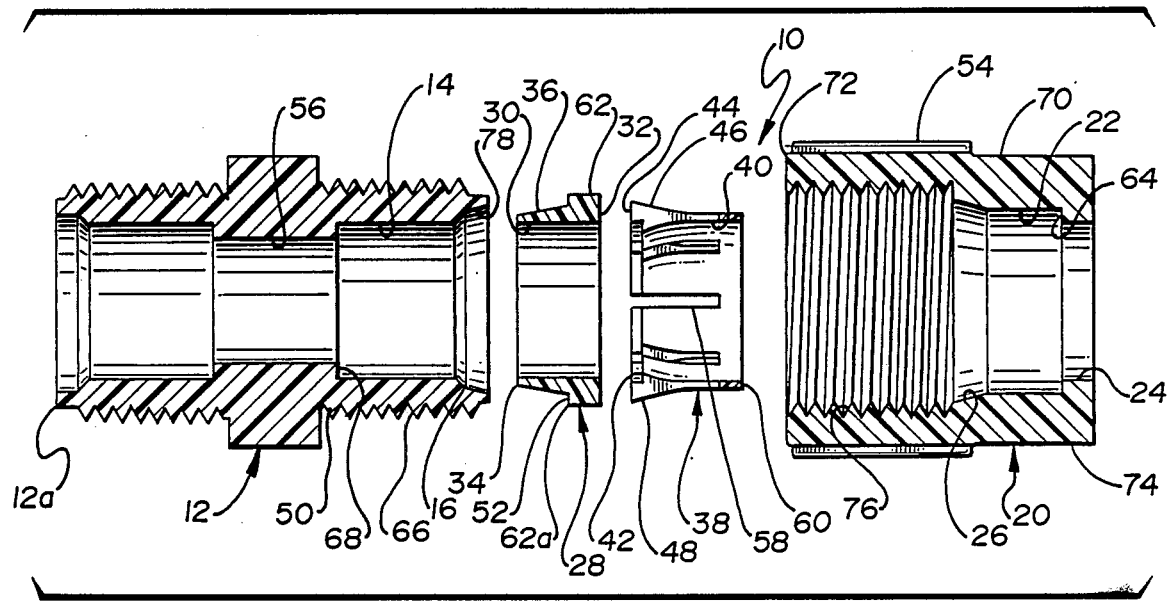
FIG. 1 an exploded view of the components of the improved connector assembly sectioned along the longitudinal axis orthogonal to the viewer and without tubing.

FIG. 1 is an exploded view showing the various components of the connector assembly of the present invention prior to engaging a piece of tubing and tightened assembly. The connector assembly, generally shown at 10, consists of a connector body 12, a nut 20, a ferrule 28 and a collet 38. While the description of this invention refers to a single tubing connection it is to be understood that the invention further comprises that a second piece of tubing can be connected to the connector body 12 by the use of a second nut, ferrule and collet subassembly at the other end 12a of the connector body 12 so that the connector body 12 lies, between the nut, collet and ferrule subassemblies and the adjacent pieces of tubing to be joined. The connector body may be a simple straight joint as illustrated in FIG. 1, an elbow joint, a tee joint or another similar fitting for joining a plurality of tubing sections.

Referring now to FIG. 1, the connector body 12 has a longitudinal bore 14 for receiving ends of tubing. In the preferred embodiment this is accomplished by a second bore 56 coaxial to the longitudinal bore 14 which creates a seat 68 at the end of the coaxial bore 56 against which the end of the tubing will bear. The connector body 12 also has a first conical surface 16 radially extending outward from the connector bore at a terminal portion 50 of the connector body 14 for receiving a ferrule 28. Preferably, the connector body 12 also has a second conical surface 78 radially extending outward from the first conical surface 16.

The nut 20 has a proximal 72 and distal 74 terminus. When assembled, the nut 20 with an internal threaded surface 76 adjacent the proximal terminus 72 of the nut threadably engages an external threaded surface 66 of the connector body 12. The nut would preferably have an appropriate and a slip-resistant surface 54 to facilitate assembly. The nut 20 has a longitudinal bore 22 for slidably engaging the tubing from the nut proximal terminus 72 and a coaxial bore 24 of slightly smaller diameter than the longitudinal bore 22 near the distal terminus creating an internal shoulder 64 against which the face 60 of the collet 38 will bear when the connector assembly is fully tightened. The nut 20 further comprises an internal tapered camming surface 26 radially extending outward from the longitudinal bore 22 toward the nut internal threaded surface 76.

The ferrule 28 of the present invention has a longitudinal bore 30 for receiving the tubing. The ferrule 28 is further characterized by a rear face 32, a blunt nose 34 and a conical surface 36 radially extending outward from the blunt nose 34 toward the rear face 32. The ferrule conical surface 36 has a lesser angle of taper than the angle of taper of the connector conical surface 16. Thus, when the ferrule conical surface 36 is received by the connector conical surface 16, the lesser angled ferrule conical surface 36 deforms the ferrule blunt nose 34 toward the ferrule bore 30 to engage the tubing. In the preferred embodiment the ferrule conical surface 36 is oriented at approximately 8°–11° with respect to the longitudinal axis of the ferrule bore 30, while the connector conical surface 16 is oriented at approximately 45° with respect to the longitudinal axis of the connector bore 14. The second conical surface 78 is oriented at approximately 15° with respect to the connector bore.

Intermediate the ferrule conical surface 36 and the rear face 32 is a raised lip 62. The raised lip 62 creates an edge 62a between the lip 62 and the ferrule conical surface 36. The preferred ferrule 28 has a plurality of concentric externally protruding flanges 52 located on the raised lip 62 at edge 62a. These flanges act to retain the ferrule in the nut bore.

The collet 38 receives tubing through its longitudinal bore 40. The collet 38 further consists of gripping means 42 located around the circumference of the collet bore 40, a rear 60 and front face 44, and a camming surface 46 radially extending outward from the collet 38 to the front face 44. The front face 44 and the collet camming surface 46 form a wedge member 48 located generally toward the front of and external to the gripping means 42. The gripping means 42 can comprise a plurality of individual sharp teeth or a single continuous sharp ridge. In the preferred embodiment a plurality of slots 58 are present around the circumference of the collet 38 cutting generally through the collet front face 44 to the far end of the collet camming surface 46 thereby forming a plurality of wedge members 48. The slots 58 minimize the amount of torque necessary to deform the gripping means 42 into the surface of the tubing. The external arc of each individual wedge member 48 has a shorter arc length than the internal arc length of the wedge member. This feature facilitates axial compression of the collet to grasp the tubing without creating undesirable rotation of the collet by the rotating nut.

The collet camming surface 46 is of greater angle of taper than the nut camming surface 26. In the preferred embodiment the collet camming surface 46 is oriented at approximately 18°–20° relative to the collet bore 40 while the nut camming surface 26 is oriented at approximately 18°–20° relative to the nut bore 22, with the chosen collet camming surface 46 having a greater angle of taper than the nut camming surface.

Figure 2:
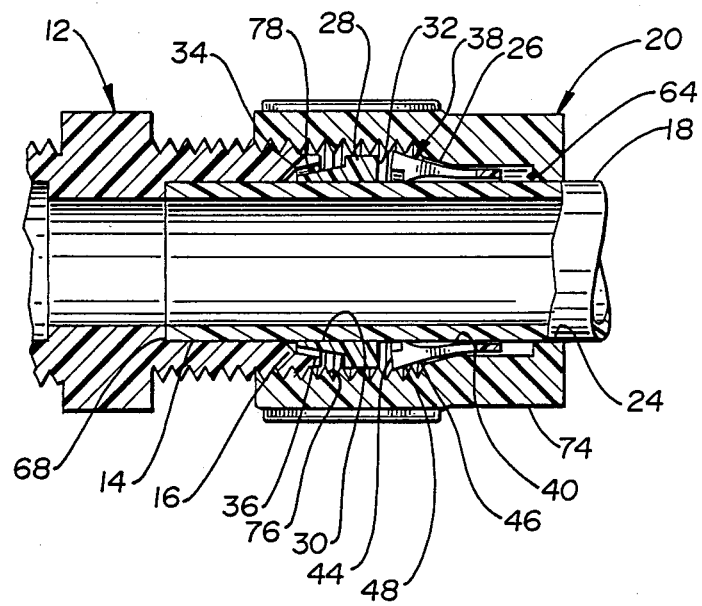
FIG. 2 is a vertical cross-sectional view of the partially assembled connector assembly along the longitudinal axis and viewed from the side.

FIG. 2 illustrates the connector assembly 10 in a partially assembled position slideably engaging a piece of tubing 18. To assemble, tubing 18 is received by the connector bore 14 and rested against seat 68. The ferrule 28 and the collet 38 are then slipped along the tubing 18 through their respective bores 30, 40, followed by the nut 20. The nut 20 is slipped along the tubing 18 until the nut can threadably engage the connector body 12. Note that the ferrule 28 and the collet 38 are aligned so that the collet front face 44 is generally parallel to the ferrule rear face 32 and the ferrule blunt nose 34 will contact the connector body 12. As the nut 20 threadably engages the connector body 12, the ferrule 28 and the collet 38 are drawn toward the connector body 12. At the partially assembled position shown in FIG. 2, the ferrule conical surface 36 is starting to engage the connector conical surface 16. Also the collet camming surface 46 is starting to engage the nut camming surface 26. The collet front face 44 does not yet abut the shoulder 64 of the nut 20.

Due to the lesser angle of taper of the ferrule conical surface 36 than the angle of taper of the connector conical surface 16, the connector conical surface 16 exerts pressure on the ferrule conical surface 36. This pressure deforms the ferrule nose 34 toward the tubing section 18 in the ferrule bore 30. Likewise, since the angle of taper of the collet camming surface 46 is greater than the angle of taper of the nut camming surface 26, the nut camming surface 26 exerts pressure on the collet camming surface 46. This pressure acts generally on the wedge 48 deforming the collet gripping means 42 toward the tubing section 18 in the collet bore 40.

Figure 3:
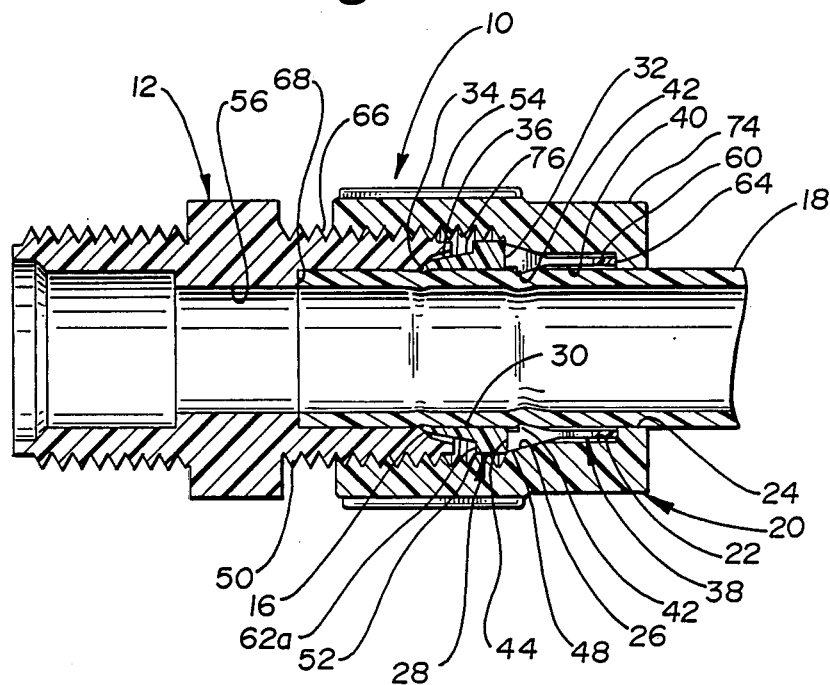
FIG. 3 is a vertical cross-sectional view of the connector assembly when completely assembled in a view similar FIG. 2.
Figure 4:
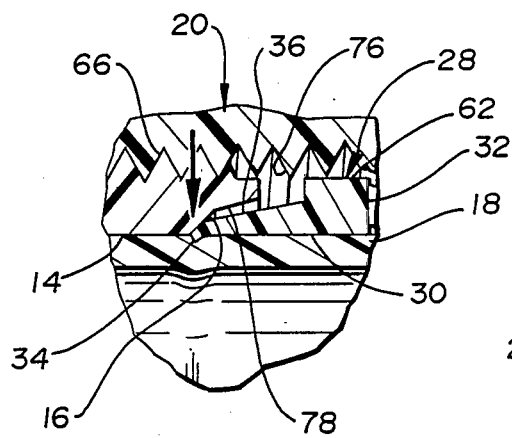
FIG. 4 is an enlarged fragmentary detail of the central area of the completely assembled fitting of FIG. 3 with a force vector indicated by an arrow.
Figure 5:
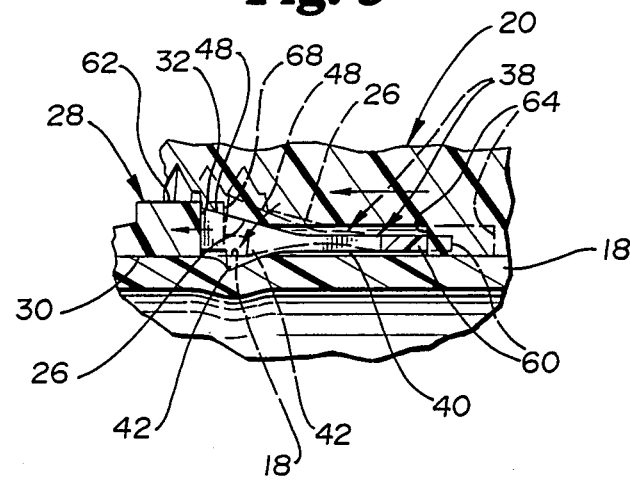
FIG. 5 is an enlarged fragmentary detail of the right central area of the assembled fitting of FIG. 3 with force vectors, motion of elements illustrated by arrows and partially assembled position shown in dashed line.

FIGS. 3 through 5 show the connector assembly 10 in a completely assembled position gripping the tubing 18. To achieve a fluid tight seal and a tight grip on the tubing, the nut 20 is completely tightened on the connector body 12. If the nut 20 is not adequately tightened, the strength of the grip is naturally reduced. A wrench engaging surface 70 and a slip-resistant surface 54 on nut 20 are present to aid tightening. When the assembly is fully tightened, the pressure exerted by the connector conical surface 16 completely deforms the ferrule nose 34 into the surface of the tubing 18. FIG. 4 is an enlarged view showing the ferrule nose 34 embedded in the surface of the tubing 18. Arrow 80 in FIG. 4 generally indicates the direction of force exerted on the ferrule blunt nose 34. Besides grasping the tubing 18, the deformation of the ferrule nose 34 produces a fluid-tight sealed relation between the connector conical surface 16 and the tubing 18.

The tightened assembly also causes the collet 38 in FIG. 3 to grasp the surface of the tubing 18. In the tightened position the collet 38 bears firmly against the internal shoulder 64 of the nut 20 and the rear face 32 of the ferrule 28. The joint forces from the ferrule rear face 32 and the nut camming surface 26 acting on the wedge 48 have pushed the wedge 48 toward the collet bore 40. More particularly, force exerted on the ferrule conical surface 36 by the connector conical surface 16 slows the forward advancement of the ferrule 28. The rear face 32 of the ferrule 28 will thus exert a stopping force on the collet front face 44 as the collet front face 44 bears against the ferrule rear face 32. This stopping force on the collet front face 44, or generally wedge 48, with the simultaneous inward force exerted on the wedge 48 from the nut camming surface 26, axially compresses the wedge 48 toward the surface of the tubing 18. Due to the location of the gripping means 42, the deformation of the wedge 48 drives the gripping means 42 into the surface of the tubing 18 producing secure gripping of the tubing.

FIG. 5 is an enlarged view depicting the gripping action of the collet gripping means 42 on the tubing surface 18. Phantom lines 68 show the position of the wedge 48 in the partially assembled position. The arrows provided in FIG. 5 indicate the relative motion of the nut 20 as it engages the connector assembly 12 and the deforming motion of the collet 38. Arrows 82 show the advancing motion of the collet 38 towards the connector 12. Arrow 84 reflects the action of the nut camming surface 26 on the collet camming surface 46.

Thus, as shown in the description of the invention, the tubing 18 is grasped both by the ferrule nose 34 and the collet gripping means 42. This joint action of the ferrule 28 and the collet 38 provides for a very strong mechanical grip on the tubing 18. The likelihood of tubing separating from the connector assembly 10 is significantly reduced. The ferrule action also results in a fluid tight seal between the connector body 12 and the tubing 18.

The connector assembly of the present invention can be constructed of numerous materials. The nut, connector body and ferrule are generally injection molded of a fluorocarbon resin material such as a perfluoroalkoxy. The collet can be made of any rigid chemically resistant material such as carbon fiber reinforced ethylene-tetrafluoroethylene. This is commercially available under the trademark TEFZEL ® by Dupont.

While specific embodiments of the invention have been shown and described in detail to illustrate the application of the inventive principles, it will be understood to those skilled in the art that the invention may be embodied otherwise without departing from such principles.

What is claimed is:

1. A tubing connector assembly for coupling tubing and forming a fluid tight seal, comprising:
   a. a connector having a longitudinal bore for receiving an end of tubing, a first conical surface radially extending outward from said longitudinal bore at a terminal portion of the connector for receiving a ferrule, and externally threaded engaging means;
   b. a nut having a proximal and a distal terminus, an internally threaded engaging means adjacent the proximal terminus of the nut for threadably engaging the connector, a longitudinal bore for receiving the end of tubing from the distal terminus, a coaxial bore near the distal terminus having a smaller diameter than the longitudinal bore, and a tapered camming surface extending radially outward from the longitudinal bore toward the internal threaded engaging means;
   c. a ferrule having a longitudinal bore for receiving said tubing, a rear face, a blunt nose opposite the rear face, and a conical outer surface extending radially inward toward the longitudinal bore converging at the blunt nose, said ferrule conical surface having a lesser angle of taper than the angle of taper of the first connector conical surface, such that as said ferrule conical surface is received by the first connector conical surface, the ferrule conical surface deforms the blunt nose toward the ferrule bore to engage the tubing; and
   d. a collet having a longitudinal bore for receiving said tubing, a front face and an external tapered camming surface adjacent to and radially extending outward toward the front face, gripping means within said collet bore adjacent the front face for gripping the tubing, said front face and said collet camming surface forming a wedge member external to the gripping means, said collet camming surface having an angle of taper greater than the angle of taper of the nut camming surface, such that as the nut threadably engages the connector the collet is drawn toward the connector, the collet front face contacts the ferrule rear face as the collet camming surface engages the nut camming surface with the resultant forces on the wedge member driving the gripping means into the tubing, and so that, when the nut fully engages the connector, the ferrule and the collet are fully enclosed within the longitudinal bore of the nut and the collet is enclosed only within the longitudinal bore of the nut.

2. The connector assembly according to claim 1, wherein said gripping means is a sharp tooth adjacent to said front face and concentric with said collet bore.

3. The connector assembly according to claim 1, wherein said gripping means is a plurality of sharp teeth adjacent to said front face and generally forming a ring concentric with said collet bore.

4. The connector assembly according to claim 1, wherein said ferrule further comprises a concentric externally protruding flange adjacent to the ferrule rear face.

5. The connector assembly according to claim 1, wherein said ferrule conical surface is oriented at approximately 8°–11° with respect to the ferrule bore.

6. The connector assembly according to claim 1, wherein said connector conical surface is oriented at approximately 45° with respect to the connector bore.

7. The connector assembly of claim 6, wherein said connector further comprises a second conical surface radially extending outward from the first conical surface, said second conical surface oriented at approximately 15° with respect to the connector bore.

8. The connector assembly of claim 1, wherein said nut further comprises an external wrench engaging surface.

9. The connector assembly of claim 1, wherein said nut further comprises an external slip-resistant surface.

10. The connector assembly of claim 1 wherein the collet camming surface is oriented at approximately 18°–20° relative to the collet bore.

11. The connector assembly of claim 1 wherein the nut camming surface is oriented at approximately 18°–20° with respect to the nut bore.

12. The connector assembly of claim 1 wherein said connector further comprises a second bore coaxial to and of smaller diameter than the connector longitudinal bore, creating a seat at the junction of the coaxial and longitudinal bores against which the end of the tubing bears.

13. The connector assembly of claim 1 wherein said collet is made of ethylene-tetrafluoroethylene.

14. The connector assembly of claim 1 wherein said nut, ferrule and connector are made of perfluoroalkoxy.

15. The connector assembly of claim 3 of said collet further comprising a plurality of slots around the circumference of the collet bore.

16. The connector assembly of claim 1, wherein said connector further comprises a second conical surface radially extending outward from said longitudinal bore at a proximal portion of the connector for receiving a ferrule.

17. The connector assembly of claim 1, wherein said connector further comprises a plurality of intersecting longitudinal bores, and a conical surface radially extending outward from each bore for receiving a ferrule.

18. The connector assembly of claim 15 wherein the external arc of the wedge member has a shorter arc length than the internal arc length of the wedge member.

19. A tubing connector assembly for coupling tubing and forming a fluid tight seal, comprising:
   a. a connector having a longitudinal bore for receiving an end of tubing, a first conical surface radially extending outward from said longitudinal bore at a terminal portion of the connector for receiving a ferrule, and externally threaded engaging means;
   b. a nut having a proximal and a distal terminus, an internally threaded engaging means adjacent the proximal terminus of the nut for threadably engaging the connector, a longitudinal bore for receiving the end of tubing from the distal terminus, a coaxial bore near the distal terminus having a smaller diameter than the longitudinal bore, and a tapered camming surface extending radially outward from the longitudinal bore toward the internal threaded engaging means;
   c. a ferrule having a longitudinal bore for receiving said tubing, a rear face, a blunt nose opposite the rear face, and a conical outer surface extending radially inward toward the longitudinal bore converging at the blunt nose, said ferrule conical surface having a lesser angle of taper than the angle of taper of the first connector conical surface, such that as said ferrule conical surface is received by the first connector conical surface, the ferrule conical surface deforms the blunt nose toward the ferrule bore to engage the tubing; and
   d. a collet having a longitudinal bore for receiving said tubing, a front face and an external tapered camming surface adjacent to and radially extending outward toward the front face, a plurality of slots around the circumference of the collet bore, gripping means within said collet bore adjacent the front face for gripping the tubing, said front face and collet camming surface in cooperation with the slots forming a plurality of wedge members external to the gripping means, said collet camming surface having an angle of taper greater than the angle of taper of the nut camming surface, such that as the nut threadably engages the connector the collet is drawn toward the connector, the collet front face contacts the ferrule rear as the collet camming surface engages the nut camming surface with the resultant forces on the wedge members driving the gripping means into the tubing, and such that the ferrule and the collet are fully enclosed within the longitudinal bore of the nut when the nut fully engages the connector.

20. The connector assembly according to claim 19, wherein said collet is enclosed only within the longitudinal bore of the nut when the nut fully engages the connector.

21. The connector assembly according to claim 19, wherein the external arc length of the wedge member is shorter than the internal arc length of the wedge member.

* * * * *